G. H. LITTLE.
INJECTOR OR EJECTOR FOR STEAM-ENGINES.
No. 7,653. Reissued May 1, 1877.
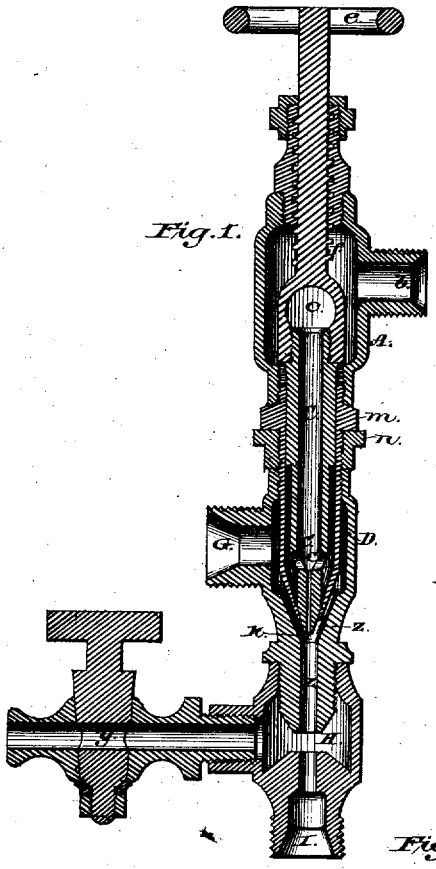
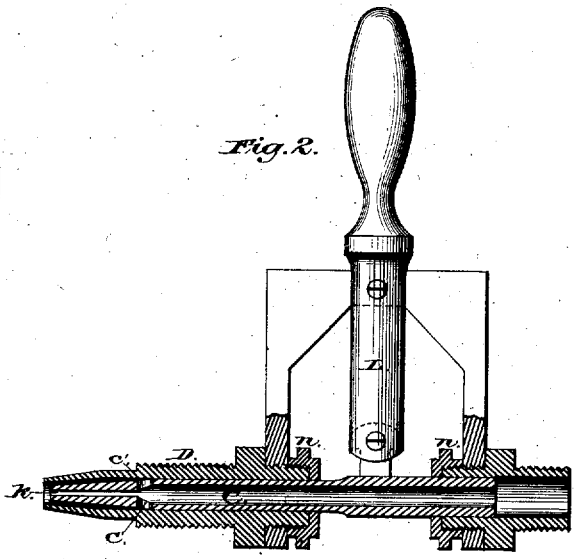
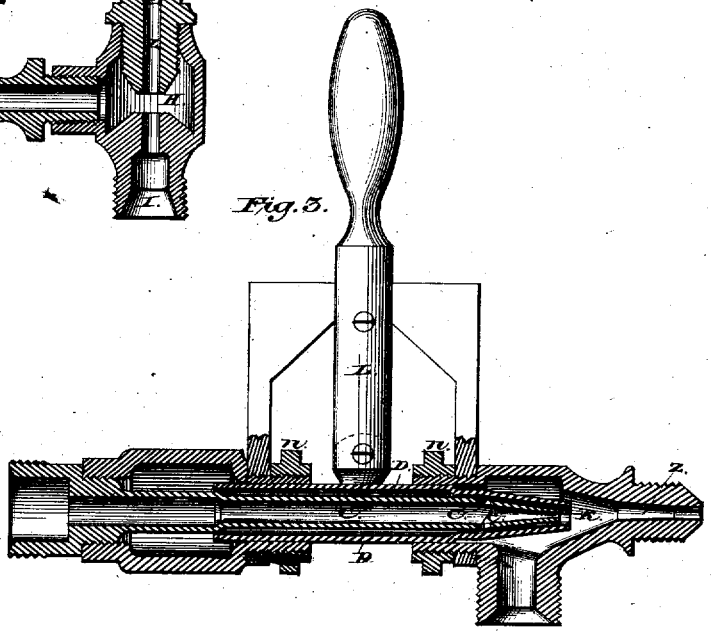
Attest:
W. R. Edelin.
Pennington Halsted
Inventor:
George H. Little
by John J. Halsted
his Atty.
N. PETERS, PHOTO-LITHOGRAPHER, WASHINGTON, D. C.

UNITED STATES PATENT OFFICE.

GEORGE H. LITTLE, OF PEABODY, MASSACHUSETTS.

IMPROVEMENT IN INJECTORS OR EJECTORS FOR STEAM-ENGINES.

Specification forming part of Letters Patent No. 163,876, dated June 1, 1875; reissue No. 7,653, dated May 1, 1877; application filed December 16, 1876.

*To all whom it may concern:*

Be it known that I, GEORGE H. LITTLE, of the town of Peabody, county of Essex, and State of Massachusetts, have invented new and useful Improvements in Injectors and Ejectors; and I do hereby declare that the following, taken in connection with the drawings which accompany and form part of this specification, is a description of my invention sufficient to enable those skilled in the art to practice it.

My improvements have for their object the drawing of water a great distance, and at the same time forcing it in a steady stream into the boiler without breaking the stream or current.

To this end they consist in the employment of a central or inmost steam-tube, which receives steam from the boiler, and which is seated near the point of an outer or surrounding tube or nozzle, the inner tube being adapted to project through such surrounding one, and having a small orifice through its pointed end, which will admit steam through the injector, when first let on without moving any of its parts, the construction being such that by moving the inner tube back after the steam has been thus let on, steam may be admitted and forced in a solid jet not only through it, but also driven through openings therein out into its surrounding tube, the joint force of these united steam-currents operating to force the water into the boiler.

Figure 1 illustrates a longitudinal section of an apparatus embodying my invention; and Figs. 2 and 3 are modifications of the same.

A is the body of the injector, having a steam-inlet, *b*. C is the inmost and main steam-tube, *c* its inlet, and D the steam tube or nozzle surrounding it, and within which the main tube C is longitudinally adjustable by means of the handle *e* and the screw-thread *f* on its shank.

The main steam-tube C receives all the steam which passes through the injector, and has a spacious axial bore or chamber, a tapering point with a small axial discharging-orifice, *k*, and also other orifices, to allow, when desired, the passage of a portion of the steam from the interior of said tube to supply the tube or nozzle D.

When the tube C is advanced to the position shown in Fig. 1 it becomes closely seated within the nozzle D, which, for this purpose, should have its bore slightly tapering, thus preventing the passage of steam by any other passage or route than through the central main steam-tube C; but when, by means of turning back the screw, the steam-tube C is released from its seat, leaving a small annular space between its exterior and the interior of the nozzle D, at their tips where tube C had previously seated on D, then a portion of the steam is permitted to pass out from C, through appropriate orifices *c′ c′*, into the nozzle D, the jet still continuing through orifice or bore *k*, and the united powers of these two steam-jets, as they become consolidated into one solid jet, force the water, which the main steam-current had caused to be drafted and supplied at G, toward and into the boiler.

It will be observed that I have no valve in my apparatus. On the contrary, the end of the inmost or steam tube makes a seat at or near the outer end of the surrounding tube or nozzle.

It will also be observed that all the steam passes through this inmost tube C, except what, perchance, may leak at the joint in moving the tube back.

To adjust the tubes C and D both at once, in order to regulate the supply of water from G around these tubes, to adapt the apparatus to the given quantity or head of water, (a given head of steam being able to force only a limited or given quantity,) these two tubes may both be turned backward or forward simultaneously, carrying with them the rear part of case A; and when adjusted to the proper position to conform to such head or pressure of water, the nut *n* is then adjusted, and the apparatus will work well under all conditions.

This adjustment of the steam-tubes may be made by simply applying a wrench to the part *m* of tube D.

By the use of an inner or central steam-tube having an axial bore or outlet, I get a straight run for the steam to draft, and upon turning back this inmost tube a large portion of the steam from within it passes through and out of it into the space around it, and between it and its surrounding tube, while the remainder passes through the axial outlet *k*, thus making nearly a solid body of steam, and the steam is still passing through the inmost tube while the injector is at work, thus helping to keep up the draft, so that it is not likely to break the current, but, on the contrary, to preserve and maintain a continuous flow.

In Fig. 2, instead of shifting the inner or steam tube by means of a threaded shank, I actuate it by a lever, L, centered upon any appropriate projection or bracket on the outer tube.

In Fig. 3 the lever is connected with and shifts the tube which surrounds the inmost or steam tube, and in both these figures, when this last-named tube is seated, the steam has a straight run instead of through a T, and consequently encounters less friction.

The injector may be made with a straight or with an increasing taper opening.

Appropriate check-nuts *n* may be used to set the parts for regulating the water-supply.

In my construction the chamber or channel *z*, from the water-inlet to the overflow, may be made either straight or tapering.

The opening leading out from the overflow may be straight, or of gradually-increasing size; and I prefer to use a straightway-cock with full side opening out from the overflow, as shown at *y* in Fig. 1.

A very important feature in my construction is that, the tube C being always filled with steam, the unseating of the tube does not break the current of water nor of steam through *k*, these currents being always continuous while there is any steam, and the main steam-current being a straight one. In other words, the central solid steam-current is always retained, and the auxiliary current from D is added to it when unseating, while heretofore, so far as I am aware, the inner current is all, or nearly all, lost when unseating.

Referring more especially to Figs. 1 and 2, it will be noticed that the inmost tube C is so steadily supported as to preclude any liability of its being strained or deflected out of line; and hence its steam-jet is always strictly central or axial. For the same reason it is not liable to vibrations as the steam is driven through.

It is evident that the steam-tube and inlet may be used for water, and the water tube and inlet for steam, if desired.

By my improvement I dispense with the use of any plug in the injector.

I do not wish to confine myself to any particular shape or style of the bore through the several openings; nor to the external shape of the apparatus; but the important feature is the inner or main steam-tube, through which the steam passes to draft or trail water, adapted to be unseated, whereby a portion of the steam may pass out of the openings into the outer tube or nozzle, and, in conjunction with the steam which passes through the end of said inner tube, force the water into the boiler.

I claim—

1. The combination of a central main steam-tube, C, having a central discharging-bore, constructed substantially as shown, and lateral outlets with a nozzle, D, receiving its steam only from such outlets, substantially as and for the purpose set forth.

2. The combination, in an injector, of the steam-tube C, the nozzle D, the nut *n*, and channel *z*, these tubes being adjustable together or independently of each other, and adapted to be locked to position by such single nut relatively to the channel *z*, substantially as and for the purpose set forth.

3. The combination of an inlet, G, steam-nozzle D, inner steam-tube C, constructed substantially as shown, the nut *n*, channel *z*, chamber H, and an outlet, I, substantially as and for the purposes set forth.

4. The described construction, consisting of the main steam-tube C, having the small outlet *k*, and the openings into the outer tube D, and through which it is supplied with steam, in combination with such outer tube, the one tube being adjustable relatively to the other, as set forth, and whereby, when the tubes are seated together, the letting on of steam will draft water without moving any of the parts, and the unseating of these tubes from each other will force the drafted water into the boiler.

5. The main and central steam-tube C, provided with side steam-outlets, and with the small orifice *k* in its end, adapting it for drafting water when seated, in combination with nozzle D, and adapted, when unseated, to permit the steam passing through the orifice to assist the steam in nozzle D to force the water into the boiler.

6. The combination of the longitudinally-adjustable nozzle D, and the central and longitudinally-adjustable steam-tube C, provided with small outlet *k*, and lateral outlets for supplying steam to nozzle D, whereby the admission of both water and steam may be regulated.

7. The combination, with the inner steam-tube C, adapted to supply steam to the outer or surrounding tube or nozzle D, of said nozzle D, and a lever-handle, L, connected to, and serving to slide, one of these tubes telescopically relatively to the other.

8. In combination, the inner steam-tube C, the outer tube D, the regulating nut or nuts, the overflow-cock, having a full-sized opening, the overflow-chamber, and the outlet I, these parts being arranged and operating substantially as shown and described.

GEO. H. LITTLE.

Witnesses:
WM. H. LITTLE,
E. M. LITTLE.